United States Patent [19]
Yoshikawa et al.

[11] Patent Number: 5,728,337
[45] Date of Patent: Mar. 17, 1998

[54] TWIN SCREW EXTRUDER AND AN EXTRUDING METHOD USING THE SAME

[75] Inventors: Tatsuya Yoshikawa, Numazu; Akiyoshi Kobayashi, Fuji, both of Japan

[73] Assignee: Toshiba Machine Co., Ltd., Tokyo, Japan

[21] Appl. No.: 683,313

[22] Filed: Jul. 18, 1996

[30] Foreign Application Priority Data

Jul. 19, 1995 [JP] Japan ................. 7-182728

[51] Int. Cl.⁶ ............................ B29C 47/76; B29C 47/40
[52] U.S. Cl. ................. 264/102; 264/211.23; 264/349; 425/203; 425/204
[58] Field of Search ................. 264/211.23, 211.24, 264/102, 349; 425/208, 209, 204, 203

[56] References Cited

U.S. PATENT DOCUMENTS

| | | | |
|---|---|---|---|
| 4,113,822 | 9/1978 | Takiura et al. | 264/211.23 |
| 4,663,103 | 5/1987 | McCullough et al. | 264/211.23 |
| 4,895,688 | 1/1990 | Shigetani et al. | 264/211.23 |
| 4,940,329 | 7/1990 | Dienst | 425/204 |
| 5,000,900 | 3/1991 | Baumgartner | 264/211.23 |
| 5,106,564 | 4/1992 | Iwanami et al. | 264/211.23 |
| 5,158,725 | 10/1992 | Handa et al. | 264/211.23 |
| 5,173,230 | 12/1992 | Colombo | 264/211.23 |
| 5,264,174 | 11/1993 | Takei et al. | 264/211.23 |

FOREIGN PATENT DOCUMENTS

| | | | |
|---|---|---|---|
| 57-22032 | 2/1982 | Japan | 264/211.23 |
| 2-001650 | 1/1990 | Japan . | |
| 3-101903 | 4/1991 | Japan | 425/208 |
| 6-55612 | 3/1994 | Japan | 425/209 |
| 6-068815 | 9/1994 | Japan . | |
| 6-068816 | 9/1994 | Japan . | |

*Primary Examiner*—Jeffery R. Thurlow
*Attorney, Agent, or Firm*—Cushman Darby & Cushman IP Group of Pillsbury Madison & Sutro LLP

[57] ABSTRACT

Each of two screw bodies includes a feed screw and a kneading screw. The feed screw is formed of a wide-flight 1-lobe intermeshing screw designed so that the ratio $W_0/D$ of the flight width $W_0$ thereof to the screw diameter D ranges from 0.2 to 0.4. The kneading screw includes a plurality of double tipped kneading discs designed so that the ratio W/D of the width W thereof in the axial direction of the screw bodies to the screw diameter D ranges from 0.3 to 1.0, and displaced from one another in the circumferential direction of the kneading screw, the angle by which any two adjacent kneading discs being displaced range such that at least a backflow of an extrusion material can be prevented.

4 Claims, 4 Drawing Sheets

5,728,337

TWIN SCREW EXTRUDER AND AN EXTRUDING METHOD USING THE SAME

BACKGROUND OF THE INVENTION

1. Field of the Invention

The present invention relates to a twin screw extruder for a resin material that contains a fine filler with the high-mixing ratio relative to the resin material, and an extruding method using the same.

2. Description of the Related Art

An intermeshing co-rotating twin screw extruder is described in Jpn. Pat. Appln. KOKOKU Publication No. 2-1650. It is a twin screw extruder for a resin material that contains a fine-powder material or fine powder. In this twin screw extruder, two screw bodies are housed in a barrel of its body in a manner such that they extend parallel to and mate with each other.

The twin screw extruder body is provided with a feed section having a feed port through which the extrusion material is supplied, a kneading section for kneading the material delivered through the feed section, an air vent section on the downstream side of the feed port, and an outlet section for the kneaded material, connected to the downstream side of the kneading section. The air vent section serves to discharge air contained in the extrusion material kneaded in the kneading section, thereby preventing a backflow of the material.

Each screw body is formed having a feed screw at the feed section and a kneading screw at the kneading section.

The twin screw extruder is operated in the following manner. As the two screw bodies are rotated, the extrusion material is delivered to the kneading section by the feed screws at the feed section. The extrusion material is kneaded by the kneading screws at the kneading section, and then continuously extruded through the outlet section.

With the progress of the kneading of the extrusion material, air contained in the material is separated. The separated air is removed by being discharged to the outside under atmospheric pressure through the air vent section on the downstream side of the feed port. Thus, the air contained in the extrusion material is prevented from flowing back toward the feed port, so that lowering of the extrusion capability of the extruder can be avoided.

Conventionally, 1-lobe intermeshing screws, such as the ones shown in FIG. 10, are used as the feed screws at the feed section of the twin screw extruder. A screw flight 2 is helically wound around the outer peripheral surface of each of screw bodies 1. The screw flight 2 of the one screw body 1 on the upstream side of the feed section is engagedly interposed between each two adjacent turns of a screw flight 2' of the other screw body 1'. Conventionally, moreover, a screw of the configuration shown in FIG. 11 is used as each kneading screw at the kneading section. In this screw, a plurality of double-tipped kneading discs 3 are arranged in the axial direction of the screw bodies 1. In this conventional kneading screw, moreover, the kneading discs 3 are successively staggered at helix angles in the rotating direction of the screw bodies 1 when viewed from the outlet section. In many cases, the helix angle α between each two adjacent kneading discs 3 is adjusted to 60° or thereabout.

Constructed in this manner, the conventional twin screw extruder is subject to the following problems.

(1) As the extrusion material is delivered from the feed section to the kneading section, air contained in the material flows back toward the feed port, in a sliding-contact region between the inner peripheral surface of the barrel 4 of the twin screw extruder body at the feed section and the tips of the screw flight 2 of each feed screw and an intermeshing region between the two feed screw flights at the feed section.

(2) In extrusion-molding a resin mixed with a mineral filler, air carried together with the mineral filler into the kneading section is compressed in the region corresponding to the kneading discs 3, and flows back toward the feed port. In the case where the staggered angle α between each two adjacent kneading discs 3 at the kneading section is adjusted to about 60°, relatively wide gaps S are formed between the discs 3, as shown in FIG. 11. Accordingly, the air contained in the extrusion material flows back through the gaps S o The generation of the backflow in the kneading section influences the feed section and causes the extrusion material to fill up the feed section. As a result, the extrusion material is fluidized by the air flowing back toward the feed port, so that the capability of the feed screws to transport the material is reduced, and hence, the extrusion capability of the entire twin screw extruder is lowered. Modern mineral fillers are finer and higher in mixing ratios, and involve these problems more intensively. It is more difficult, therefore, to to improve the extrusion capability of the twin screw extruder as a whole.

(3) If the extrusion material is highly viscous with the filler which is fine and constant in a high-mixing ratio relative to the resin material, the backflow of the air toward the feed port cannot be fully prevented by the conventional air-vent extruding method.

SUMMARY OF THE INVENTION

The present invention has been contrived in consideration of these circumstances, and its object is to provide a twin screw extruder, in which air contained in an extrusion material can be prevented from flowing back toward a feed section, so that the capability of the extruder to extrude a resin material that contains a filler, and high-mixing ratio can be improved, and an extruding method using the same.

In order to achieve the above object, according to the present invention, there is provided a twin screw extruder, which comprises a twin screw extruder body including two screw bodies arranged parallel to each other and kept in engagement with each other, a barrel containing the screw bodies, a feed section supplied with an extrusion material, a kneading section on the downstream side of the feed section for kneading the extrusion material, an air vent section through which air contained in the extrusion material kneaded in the kneading section is discharged, and an outlet section for the kneaded extrusion material, connected to the downstream side of the kneading section, whereby the extrusion material fed from the feed section to the kneading section and kneaded therein is continuously extruded through the outlet section as the screw bodies rotate, each of the screw bodies including a feed screw at the feed section and a kneading screw at the kneading section, the feed screw being formed of a wide-flight 1-lobe intermeshing screw designed so that the ratio $W_0/D$ of the flight width $W_0$ thereof to the screw diameter D ranges from 0.2 to 0.4, the kneading screw including a plurality of double-tipped kneading discs and arranged in the axial direction of the screw bodies, the kneading discs being designed so that the ratio W/D of the width W thereof in the axial direction of the screw bodies to the screw diameter D ranges from 0.3 to 1.0, and displaced from one another in the circumferential direction of the kneading screw, the angle by which any two adjacent discs being displaced a range such that at least a backflow of the extrusion material can be prevented.

The extrusion material is delivered from the feed section to the kneading section by means of the feed screw, which is formed of a wide-flight 1-lobe intermeshing screw designed so that the ratio $W_0/D$ of the flight width $W_0$ thereof to the screw diameter D ranges from 0.2 to 0.4. Thus, a backflow of the air contained in the extrusion material in the feed section can be prevented, whereby the capability of the extruder to transport the extrusion material can be improved.

Further, the extrusion material is kneaded by means of the kneading screw that is constructed in the aforesaid manner, so that the capabilities of the extruder to plasticize and extrude the extrusion material can be improved.

Thus, according to the present invention, the air contained in the extrusion material can be prevented from flowing back toward the feed section, and the capability of the extruder to extrude a resin material that contains a fine filler with the high-mixing ratio relative to the resin material can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

Figure 1:
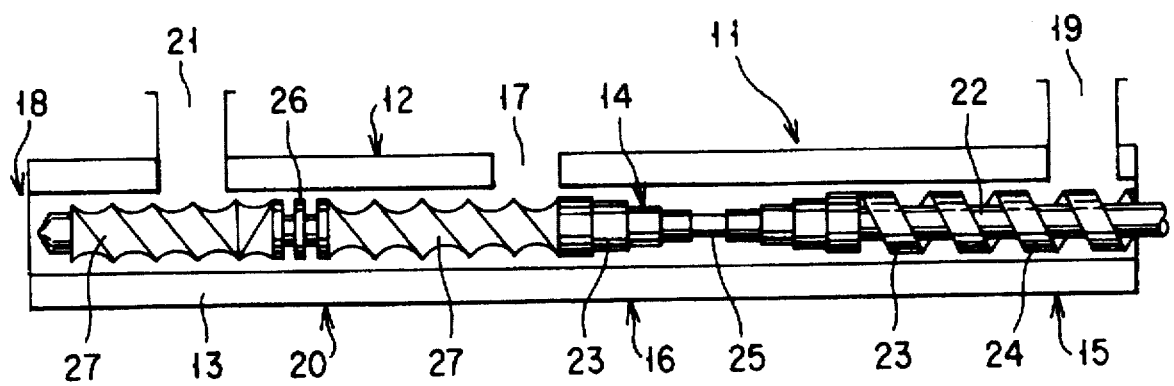
FIG. 1 is a schematic view showing an outline of a twin screw extruder according to an embodiment of the present invention.

An embodiment of the present invention will now be described with reference to the accompanying drawings of FIGS. 1 to 9. FIG. 1 shows an outline of a intermeshing co-rotating twin screw extruder 11 according to this embodiment. The twin screw extruder 11 is used to knead and extrude an extrusion material formed of a resin composition that contains a fine-powder filler in high-mixing ratio relative to the resin material. The extrusion material used in this embodiment is a resin composition containing 10 to 90% by weight of a mineral filler.

A body 12 of the extruder 11 includes a barrel 13. Two screw bodies 14 are housed in the barrel 13 in a manner such that they extend parallel to and mate with each other. These screw bodies 14 are rotated in the same direction by means of rotating devices, individually.

Further, the extruder body 12 is provided with a feed section 15, kneading section 16, air vent section 17, and outlet section 18. The feed section 15 is supplied with the extrusion material. The kneading section 16 is located on the downstream side of the feed section 15 and serves to knead the extrusion material. The air vent section 17 is a hole through which air contained in the extrusion material, kneaded in the kneading section 16, is discharged to the outside. The outlet section 18 is connected to the downstream side of the kneading section 16 and serves as an outlet for the kneaded extrusion material. As the screw bodies 14 rotate, the kneaded extrusion material, delivered from the feed section 15 to the kneading section 16 and kneaded therein, is extruded continuously through the outlet section 18.

The feed section 15 of the extruder body 12 is formed having a feed port 19 in the side wall of the barrel 13. The extrusion material, e.g., the resin composition containing 10 to 90% by weight of the mineral filler, is fed into the feed section 15 through the feed port 19.

A vacuum sealing section 20 is provided between the air vent section 17 and the outlet section 18 (for the kneaded extrusion material) of the extruder body 12. On the downstream side of the sealing section 20, a vacuum vent port 21 is formed in the side wall of the barrel 13.

Each screw body 14 is formed of a screw shaft 22 and a plurality of screw elements 23. The screw elements 23 are attached to the screw shaft 22 by spline-key fitting, for example.

The screw elements 23 include a feed screw 24 located corresponding to the feed section 15 of the screw body 14, a kneading screw 25 corresponding to the kneading section 16, a vacuum sealing screw 26 corresponding to the vacuum sealing section 20, and a pair of screws 27 on either side of the sealing section 20.

Figure 2:
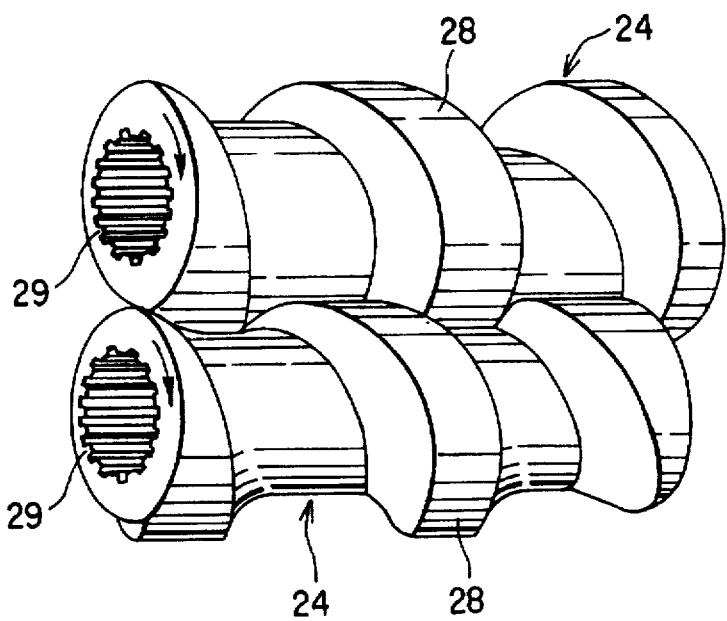
FIG. 2 is a perspective view showing feed screws of the extruder of FIG. 1.
Figure 3A:
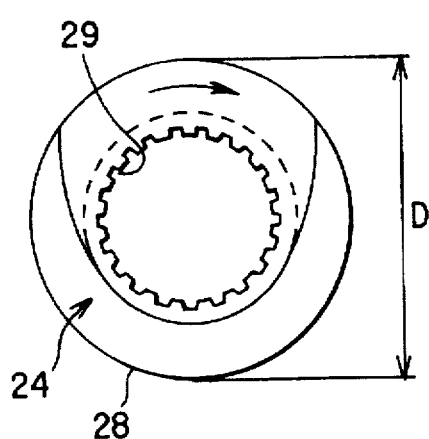
FIG. 3A is a plan view showing an end face of the feed screw of FIG. 2.
Figure 3B:
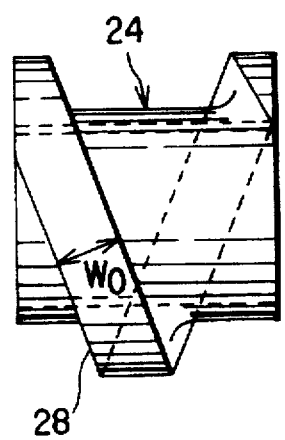
FIG. 3B is a side view of the feed screw.

As shown in FIGS. 2, 3A and 3B, the feed screw 24 is integrally formed of a 1-lobe intermeshing screw with a large flight width. A flight portion 28 is helically wound around the outer peripheral surface of the feed screw 24. The feed screw 24 is designed so that the ratio $W_0/D$ of the flight width $W_0$ of the flight portion 28 shown in FIG. 3B to the screw diameter D shown in FIG. 3A ranges from 0.2 to 0.4. $W_0$ is the perpendicular width of the flights.

Spline fitting grooves 29 are formed on the inner peripheral surface of the feed screw 24. The grooves 29 mate individually with splines on the screw shaft 22. The two screw bodies 14 of the feed section 15 engage each other in the manner shown in FIG. 2. In this intermeshing region, the flight portion 28 of the one screw body 14 is interposed between each two adjacent turns of the flight portion 28 of the other screw body 14.

Figure 5:
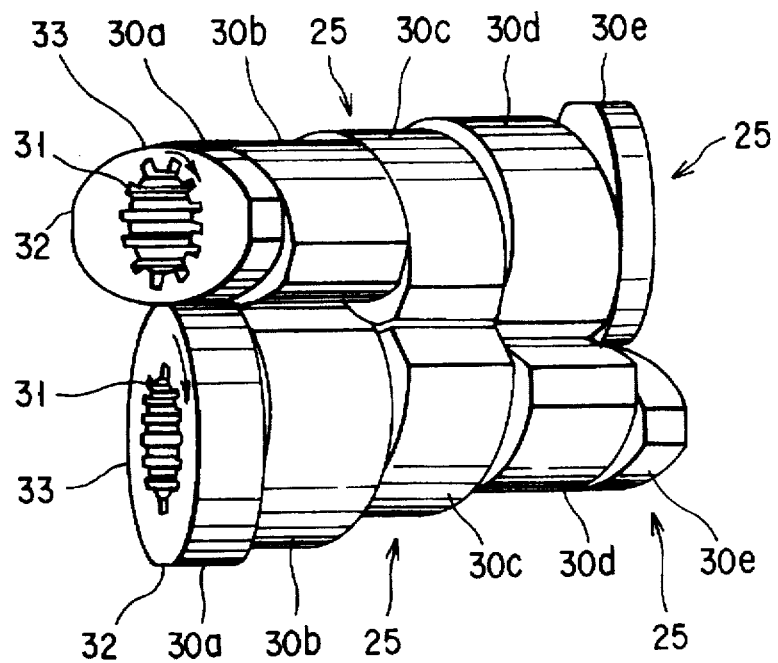
FIG. 5 is a perspective view of the kneading screws shown in FIG. 4.
Figure 6A:
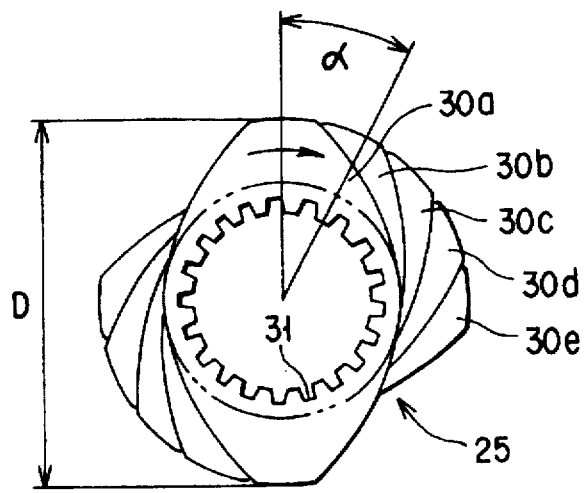
FIG. 6A is a plan view showing an end face of the kneading screw of FIG. 5.
Figure 6B:
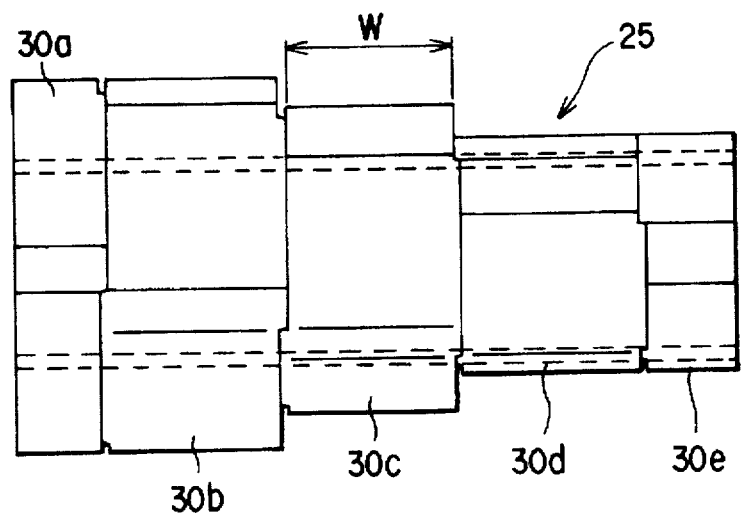
FIG. 6B is a side view of the kneading screw of FIG. 6A.

As shown in FIGS. 5, 6A and 6B, the kneading screw 25 includes a plurality of double-tipped kneading discs 30a to 30e having a substantially oval cross section and arranged in the axial direction of the screw shaft 22. The kneading discs are formed integrally with one another by machining. Each kneading disc is designed so that the ratio W/D of its axial width W shown in FIG. 6B to the screw diameter D shown in FIG. 6A ranges from 0.3 to 1.0.

Further, the kneading discs 30a to 30e are displaced from one another in the circumferential direction of the kneading screw 25, when viewed from the outlet section 18. The angle α by which any two adjacent kneading discs are displaced ranges from about 18° to 30° so that at least a backflow of the extrusion material can be prevented.

Spline fitting grooves 31 are formed on the inner peripheral surface of each kneading disc of the kneading screw 25. The grooves 31 mate individually with the splines on the screw shaft 22. The two screw bodies 14 at the kneading section 16 are rotated in a manner such that their rotation cycles are kept staggered at 90°.

Figure 4:
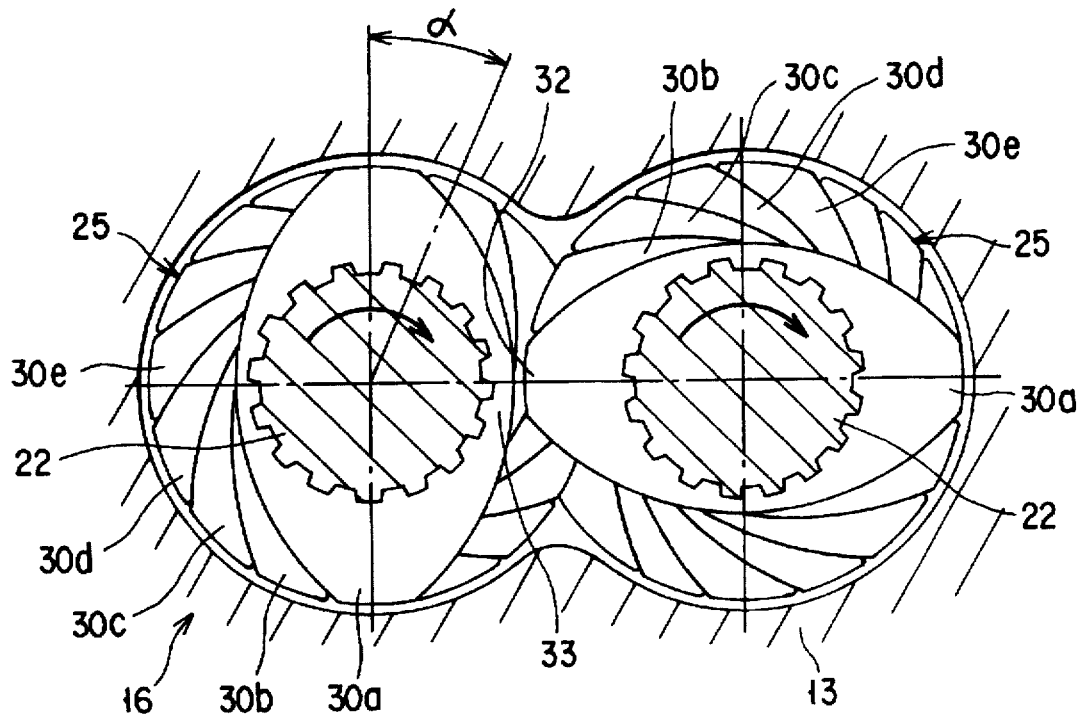
FIG. 4 is a cross-sectional view showing the way kneading screws in a barrel of the body of the twin screw extruder engage each other.

When one of the kneading discs 30a to 30e of the kneading screw 25 of the one screw body 14, e.g., the right-hand disc 30a in FIG. 4, is moved to a lateral rotational position, one of the kneading discs 30a to 30e of the kneading screw 25 of the other screw body 14, e.g., the left-hand disc 30a in FIG. 4, moves to a vertical rotational position. At the point of time shown in FIG. 4, therefore, a large-diameter portion 32 of the right-hand kneading disc 30a in the lateral position is kept close to a small-diameter portion 33 of the left-hand kneading disc 30a in the vertical position.

The following is a description of an extruding method for the extrusion material using the twin screw extruder 11 according to the present embodiment described above. The extrusion material used in this method is a resin composition containing a fine filler with the high-mixing ratio relative to the resin material.

When in operation, the two screw bodies 14 of the twin screw extruder 11 are first rotated in the same direction. In this state, the extrusion material is fed into the barrel 13 through the feed port 19 of the feed section 15. As this is done, the barrel 13 is controlled so that it is kept at a suitable temperature, depending on the kind and state of the extrusion material or resin being extruded.

Figure 7A:
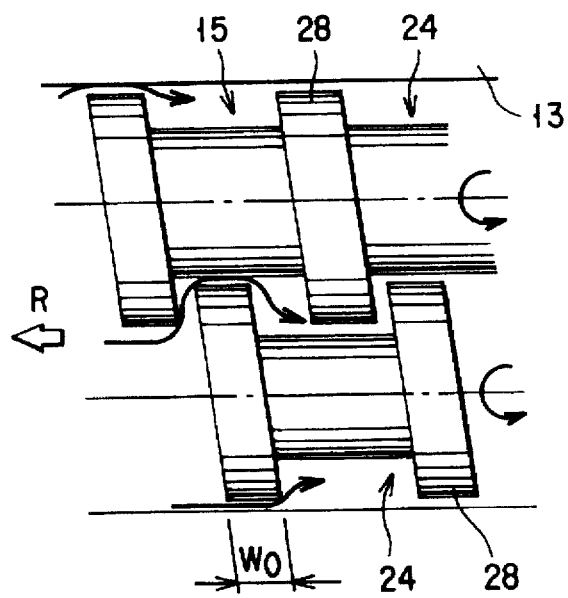
FIG. 7A is a diagram for illustrating the operation of the feed screws.

As the feed screws 24 rotate, the extrusion material fed into the barrel 13 is transported to the kneading section 16 (extrusion material transportation process). According to this embodiment, each feed screw 24 is formed of a wide-flight 1-lobe intermeshing screw designed so that the ratio $W_0/D$ of the flight width $W_0$ of the flight portion 28 to the screw diameter D ranges from 0.2 to 0.4. As shown in FIG. 7A, therefore, the sealing effect can be improved in a sliding-contact region between the inner peripheral surface of the barrel 13 at the feed section 15 and the tips of the screw flight 28 of each feed screw 24 and an intermeshing region between the respective feed screw flights 24 of the two screw bodies 14 at the feed section 15. Thus, while the extrusion material is transported leftward in the feed section 15, as indicated by arrow R in FIG. 7A, air contained in the extrusion material can be prevented from flowing back toward the feed port 19 through the sliding-contact region and the intermeshing region, as indicated by arrows in FIG. 7A.

Subsequently, a kneading process for the extrusion material is carried out in the kneading section 16. In this process, the two kneading screws 25 at the kneading section 16 are rotated in a manner such that their rotation cycles are kept staggered at 90°. As the kneading screws 25 rotate in this manner, the extrusion material fed from the feed section 15 is kneaded.

In this extrusion material kneading process, the extrusion material is kneaded and suitably plasticized without filling the barrel 13 as the kneading discs 30a to 30e of the two kneading screws 25 rotate. In this embodiment, the ratio W/D of the axial width W of each kneading disc of each kneading screw 25 to the screw diameter D ranges from 0.3 to 1.0, so that the kneading discs 30a to 30e themselves are wide in the axial direction. Accordingly, the extrusion material resin can be easily sheared, extended, and melted between the inner peripheral surface of the barrel 13 and the outer end portion of the large-diameter portion 32 of each kneading disc. Thus, most of the material resin fed into the kneading section 16 can be melted in advance, so that air can be easily removed from the material.

Figure 7B:
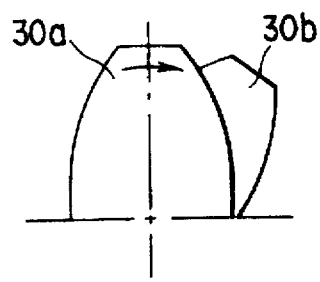
FIG. 7B is a diagram for illustrating the operation of the kneading screw.

The extrusion material in the kneading section 16 is further fed downstream under pressure from the extrusion material newly continuously supplied from the feed section 15. According to this embodiment, the kneading discs 30a to 30e of the kneading screw 25 are displaced from one another in the circumferential direction of the kneading screw 25, when viewed from outlet section 18, and the angle α by which any two adjacent kneading discs are displaced ranges from about 18° to 30° so that at least a backflow of the extrusion material can be prevented. As the extrusion material in the kneading section 16 flows past the kneading discs 30a to 30e, therefore, the wall surface of each upstream-side disc is situated just beside the material passage groove of each adjacent downstream-side disc. If the downstream-side disc is the kneading disc 30a, as shown in FIG. 7B, for example, the wall surface of the kneading disc 30b is situated beside the passage of the disc 30a. Accordingly, when the extrusion material in the kneading section 16 flows downstream through the material passage groove of the downstream-side disc 30a, it can be prevented from flowing upstream or backward by the wall surface of the upstream-side disc 30b that adjoins the disc 30a. Thus, the extrusion material in the kneading section 16 can be securely fed downstream. In consequence, a backflow of the extrusion material from the kneading section 16 to the feed section 15 can be avoided, so that the extrusion material can be prevented from filling the feed section 15 and lowering the extrusion capability of the extruder.

As the extrusion material is fed from the feed section 15 to the kneading section 16 and kneaded therein, moreover, air separated from the filler in the material is prevented from flowing back toward the feed port 19 of the feed section 15 by the high sealing effect of the feed screw 24 of the feed section 15 and the kneading discs 30a to 30e of the kneading section 16. Thus, the air separated from the filler can be guided to the downstream side of the kneading section 16 (left-hand side of the kneading section 16 in FIG. 1) and securely discharged to the outside through the air vent section 17.

The extrusion material resin, plasticized as it flows past the rotating parts of the kneading discs 30a to 30e of the two kneading screws 25, passes through the vacuum sealing section 20, and is devolatilied. Thereafter, the extrusion material is guided further downstream and delivered to the next extrusion process. In this extrusion process, the extrusion material kneaded in the kneading section 16 is fed under pressure to the downstream side of the kneading section 16 as the feed screws 27 rotate, and is continuously extruded through the outlet section 18.

The twin screw extruder 11 according to the present embodiment provides the following effects. According to this embodiment, the feed screw 24 of the feed section 15 is formed of a wide-flight 1-lobe intermeshing screw designed so that the ratio $W_0/D$ of the flight width $W_0$ of the flight portion 28 to the screw diameter D ranges from 0.2 to 0.4. Therefore, the sealing effect can be improved in the sliding-contact region between the inner peripheral surface of the barrel 13 at the feed section 15 and the outer peripheral surface of the flight portion 28 of each feed screw 24 and the intermeshing region between the respective feed screw flights 24 of the two screw bodies 14 at the feed section 15. Thus, while the extrusion material is transported downward in the feed section 15, air contained in the material can be prevented from flowing back toward the feed port 19.

According to this embodiment, moreover, the ratio $W/D$ of the axial width W of each kneading disc of each kneading screw 25 to the screw diameter D ranges from 0.3 to 1.0, so that the kneading discs 30a to 30e themselves are wide in the axial direction. Accordingly, the extrusion material resin can be easily sheared, extended, and melted between the inner peripheral surface of the barrel 13 and the outer end portion of the large-diameter portion 32 of each kneading disc. Thus, most of the material resin fed into the kneading section 16 can be melted in advance, so that air can be easily removed from the material.

According to this embodiment, furthermore, the kneading discs 30a to 30e of the kneading screw 25 are displaced from one another in the circumferential direction of the kneading screw 25, when viewed from outlet section 18, and the angle α by which any two adjacent kneading discs are displaced ranges restricted from about 18° to 30° so that at least a backflow of the extrusion material can be prevented. When the extrusion material in the kneading section 16 flows downstream through the material passage groove of the downstream-side disc 30a, therefore, it can be prevented from flowing upstream or backward by the wall surface of the upstream-side disc 30b that adjoins the disc 30a. Thus, the extrusion material can be prevented from filling the feed section 15 and lowering the extrusion capability of the extruder.

In the extruder 11 of present embodiment, a high sealing effect can be obtained in the regions corresponding to the feed screws 24 of the feed section 15 and the kneading discs 30a to 30e of the kneading section 16. As the extrusion material is fed from the feed section 15 to the kneading section 16 and kneaded therein, therefore, air separated from the filler in the material is prevented from flowing back toward the feed port 19 of the feed section 15. Thus, the air separated from the filler can be securely discharged to the outside through the air vent section 17 on the downstream side of the kneading section 16. In consequence, the capability of the extruder to extrude the resin material that contains the filler in high concentration can be improved.

Tables 1 to 5 show the results of experiments conducted to ascertain the effects of the twin screw extruder 11 according to the present embodiment. Examples 1 to 3 of Table 1 represent the result (Example 1) of extrusion of an extrusion material (polypropylene (PP) pellets) in a conventional twin screw extruder and the results (Examples 2 and 3) of extrusion of the extrusion material (PP pellets) in Embodiments 1 and 2 of the twin screw extruder 11 of the present invention. In Table 1, talc is magnesium silicate as a mineral filler contained in the extrusion material resin, Q is the delivery of the extrusion material, and Ns is the screw speed of the twin screw extruders.

TABLE 1

| Extrusion Conditions | Example 1 (Prior Art) | Example 2 (Embodiment 1) | Example 3 (Embodiment 2) |
|---|---|---|---|
| Screw diameter (D, mm) | 58 | 58 | 58 |
| Resin | PP pellets | PP pellets | PP pellets |
| Resin MI (g/10 min) | 5.0 | 5.0 | 5.0 |
| Talc particle diameter (μm) | 2 | 2 | 2 |
| Talc content (%) | 60 | 60 | 57 |
| Ns (rpm) | 300 | 250 | 200 |
| Q (Kg/H) | 100 | 150 | 140 |

In the conventional twin screw extruder (Example 1), as seen from Table 1, the delivery Q of 100 kg/H required the screw speed of 300 rpm. In Embodiments 1 and 2 (Example 2 and 3) of the twin screw extruder 11 of the invention, in contrast with this, the delivery Q increased, and the screw speed Ns was able to be lowered.

Examples 4 to 7 shown in Table 2 below represent the result (Example 4) of extrusion of the extrusion material in a conventional twin screw extruder, the results (Examples 5 and 6) of extrusion of the extrusion material in a modification of the twin screw extruder 11 of the invention, and the result (Example 7) of extrusion of the extrusion material in Embodiment 3 of the twin screw extruder 11 of the invention.

TABLE 2

| Extrusion Conditions | Example 4 (Prior Art) | Example 5 | Example 6 | Example 7 (Embodiment 3) |
|---|---|---|---|---|
| Feed section screw shape configuration | Prior art 2-lobe intermeshing screw | 1-lobe intermeshing screw of invention | Prior art 2-lobe intermeshing screw | 1-lobe intermeshing screw of invention |
| Kneading disc shape configuration | Prior art (standard) | Prior art (standard) | Invention | Invention |
| Screw diameter (D, mm) | 58 | 58 | 58 | 58 |
| Resin | PP pellets | PP pellets | PP pellets | PP pellets |
| Resin MI (g/10 min) | 5.0 | 5.0 | 5.0 | 5.0 |
| Talc content (%) | 60 | 60 | 60 | 60 |
| NS (rpm) | 300 | 380 | 300 | 250 |
| Q (Kg/H) | 100 | 130 | 100 | 150 |
| Q/Ns | 0.33 | 0.34 | 0.33 | 0.6 |

In the case where only the feed screws 24 of the feed section 15 or the kneading screws 25 of the kneading section 16 are used in combination with conventional screws, as in the cases of Examples 5 and 6 in Table 2, the delivery Q and the screw speed Ns are lower and higher, respectively, than values for Example 7 or Embodiment 3 of the twin screw extruder 11 of the invention. As seen from these results, the effects of the present invention are not good enough in the case where only the feed screws 24 or the kneading screws 25 are combined with the conventional screws, and satisfactory effects can be obtained by combining the feed screws 24 and the kneading screws 25 of the twin screw extruder 11 according to the invention.

Examples 8 to 13 shown in Table 3 below represent the relations between $W_0/D$ and $Q/Ns$ of the flight portion 28 of the feed screw 24 of the feed section 15.

TABLE 3

|  | $W_0/D$ | $Q/Ns$ |
| --- | --- | --- |
| Example 8 | 0.311 | 0.6 |
| Example 9 | 0.311 | 0.7 |
| Example 10 | 0.389 | 0.429 (0.4) |
| Example 11 | 0.234 | 0.5 |
| Example 12 | 0.234 | 0.48 |
| Example 13 | 0.066 | 0.3–0.33 |

Figure 8:
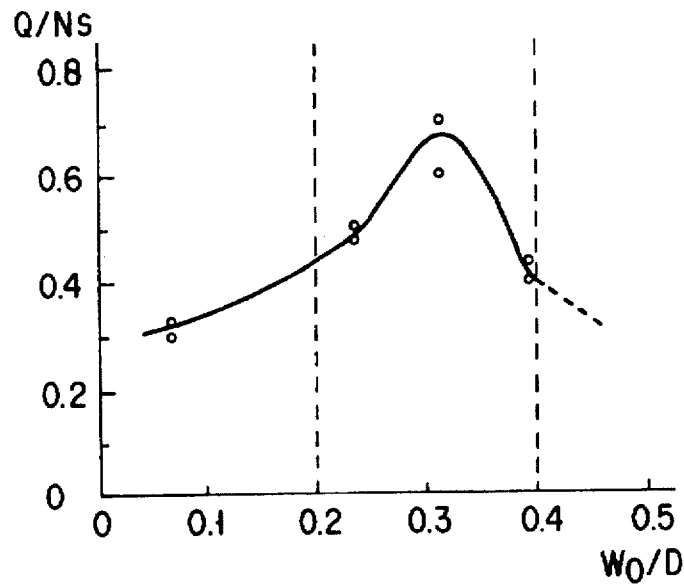
FIG. 8 shows a characteristic curve representing the relation between $W_0/D$ and Q/Ns of the feed screw.
Figure 10:
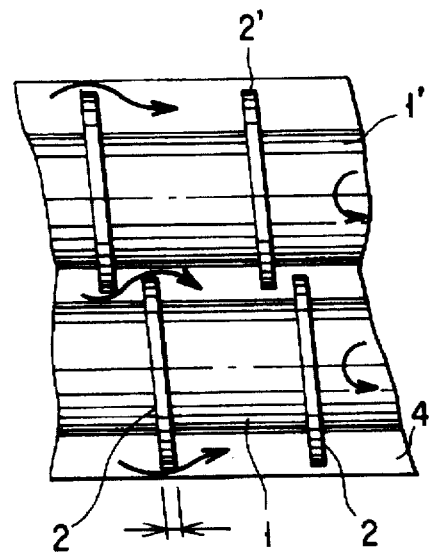
FIG. 10 is a side view showing feed screws of a conventional twin screw extruder.

FIG. 8 is a graph showing experimental data for Examples 8 to 13 of Table 3. As seen from FIG. 8, the twin screw extruder 11 displays high capability with $Q/Ns$ at 0.4 or more in the case where $W_0/D$ ranges from 0.2 to 0.4.

Examples 14 to 19 shown in Table 4 below represent the relations between $W/D$ and $Q/Ns$ of the kneading screw 25 of the kneading section 16.

TABLE 4

|  | $W_0/D$ | $Q/Ns$ |
| --- | --- | --- |
| Example 14 | 0.503 | 0.5 |
| Example 15 | 0.464 | 0.429 |
| Example 16 | 0.122 | 0.192 |
| Example 17 | 0.071 | — |
| Example 18 | 1.563 | 0.333 |
| Example 19 | 0.955 | 0.366 |

Figure 9:
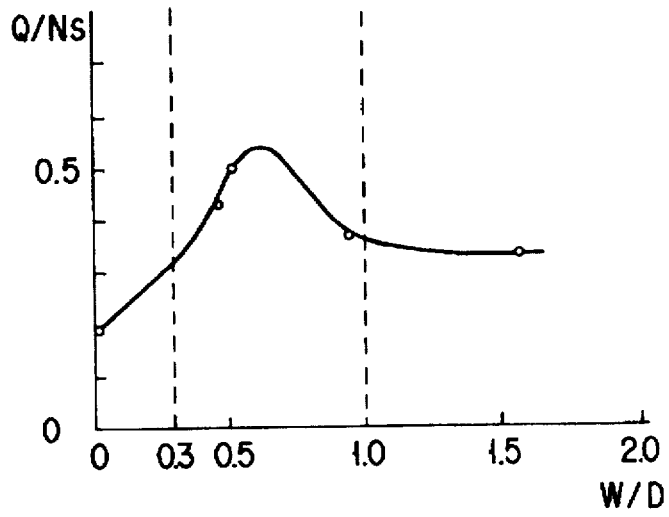
FIG. 9 shows a characteristic curve representing the relation between W/D and Q/Ns of the kneading screw.
Figure 11:
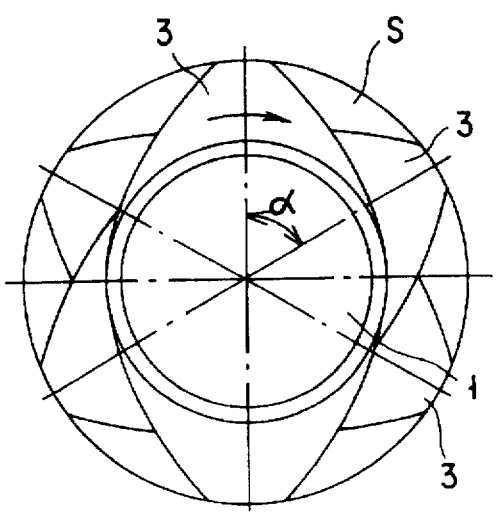
FIG. 11 is a plan view showing an end face of a kneading screw of the conventional twin screw extruder.

FIG. 9 is a graph showing experimental data for Examples 14 to 19 of Table 4. As seen from FIG. 9, the twin screw extruder 11 displays high capability with increased $Q/Ns$ in the case where $W/D$ ranges from 0.3 to 1.0. If $W/D$ is higher than 1.0, the kneading screw 25 of the kneading section 15 may possibly be damaged.

Table 5 below comparatively shows the results of extrusion of the extrusion material in the case where the angle α by which any two adjacent kneading discs of the kneading screw 25 is adjusted to 60° and in the case where the angle α is adjusted to 22.5°.

TABLE 5

| α | Ns (rpm) | Q (Kg/H) | Critical Talc mixing ratio (%) |
| --- | --- | --- | --- |
| 60° | 200 | 108 | 56 |
| 22.5° | 250 | 120 | 60 |

If the angle α by which any two adjacent kneading discs of the kneading screw 25 is adjusted to 60°, as seen from Table 5, the capability of the twin screw extruder 11 is lowered, and 56% of talc or more cannot be added.

It is to be understood that the present invention is not limited to the embodiment described above, and that various changes and modifications may be effected therein by one skilled in the art without departing from the scope or spirit of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A twin screw extruder comprising:

a twin screw extruder body including two screw bodies arranged parallel to each other and kept in engagement with each other;

a barrel having a circular cross section and containing the screw bodies;

a feed section supplied with an extrusion material;

a kneading section on a downstream side of the feed section for kneading the extrusion material;

an air vent section on a downstream side of the kneading section through which air contained in the extrusion material kneaded in the kneading section is discharged, and an outlet section for the kneaded extrusion material, connected to the downstream side of the kneading section;

whereby the extrusion material fed from the feed section to the kneading section and kneaded therein is continuously extruded through the outlet section as the screw bodies rotate;

each said screw body including a feed screw at the feed section and a kneading screw at the kneading section;

the feed screw being formed of a wide-flight 1-lobe intermeshing screw having the ratio $W_0/D$ of the flight width $W_0$ thereof to the screw diameter D ranges from 0.2 to 0.4;

the kneading screw including a plurality of double-tipped kneading discs and arranged in the axial direction of the screw bodies;

wherein the ratio $W/D$ of the width W of the kneading discs in the axial direction of the screw bodies to the screw diameter D ranges from 0.3 to 1.0, and the kneading discs are displaced from one another in the circumferential direction of the kneading screw, the angle by which any two adjacent kneading discs being displaced being such that at least a backflow of the extrusion material can be prevented.

2. The twin screw extruder according to claim 1, wherein said extrusion material is formed of a resin composition containing 10 to 90% by weight of a mineral filler, and said twin screw extruder body is formed of a intermeshing co-rotating twin screw extruder and serves continuously to extrude the extrusion material.

3. The twin screw extruder according to claim 1, wherein the angle by which any two adjacent kneading discs of said kneading screw are displaced ranges from about 18° to 30°.

4. An extruding method using a twin screw extruder, which extruder comprises a twin screw extruder body including two screw bodies arranged parallel to each other and kept in engagement with each other, a barrel having a circular cross section and containing the screw bodies, a feed section supplied with the extrusion material, a kneading section on the downstream side of the feed section for kneading the extrusion material, an air vent section on a downstream side of the kneading section through which air contained in the extrusion material kneaded in the kneading section is discharged, and an outlet section for the kneaded extrusion material, connected to the downstream side of the kneading section, whereby the extrusion material fed from the feed section to the kneading section and kneaded therein is continuously extruded through the outlet section as the screw bodies rotate, wherein the twin screw extruder body formed of an intermeshing co-rotating twin screw extruder the extruding method comprising:

feeding the extrusion material to the feed section, said extrusion material being formed of a resin composition containing 10 to 90% by weight of a mineral filler;

transporting the extrusion material, fed to the feed section, to the kneading section as a feed screw rotates, the feed screw being formed of a wide-flight 1-lobe intermeshing screw having the ratio $W_o/D$ of the flight width $W_o$ thereof to the screw diameter D rages from 0.2 to 0.4;

kneading the extrusion material fed from the feed section as a kneading screw rotates, the kneading screw including a plurality of double tipped kneading discs and arranged in the axial direction of the screw bodies, the kneading discs being such that the ratio $W/D$ of the width W thereof in the axial direction of the screw bodies to the screw diameter D ranges from 0.3 to 1.0, and displaced from one another in the circumferential direction of the kneading screw, the angle by which any two adjacent kneading discs being displaced range such that at least a backflow of the extrusion material can be prevented;

discharging through the air vent section air contained in the extrusion material kneaded in the kneading process; and continuously extruding the extrusion material kneaded in the kneading section through the outlet section while allowing the air contained in the extrusion material kneaded in the kneading process to be discharged through the air vent section.

* * * * *